Patented Oct. 20, 1931

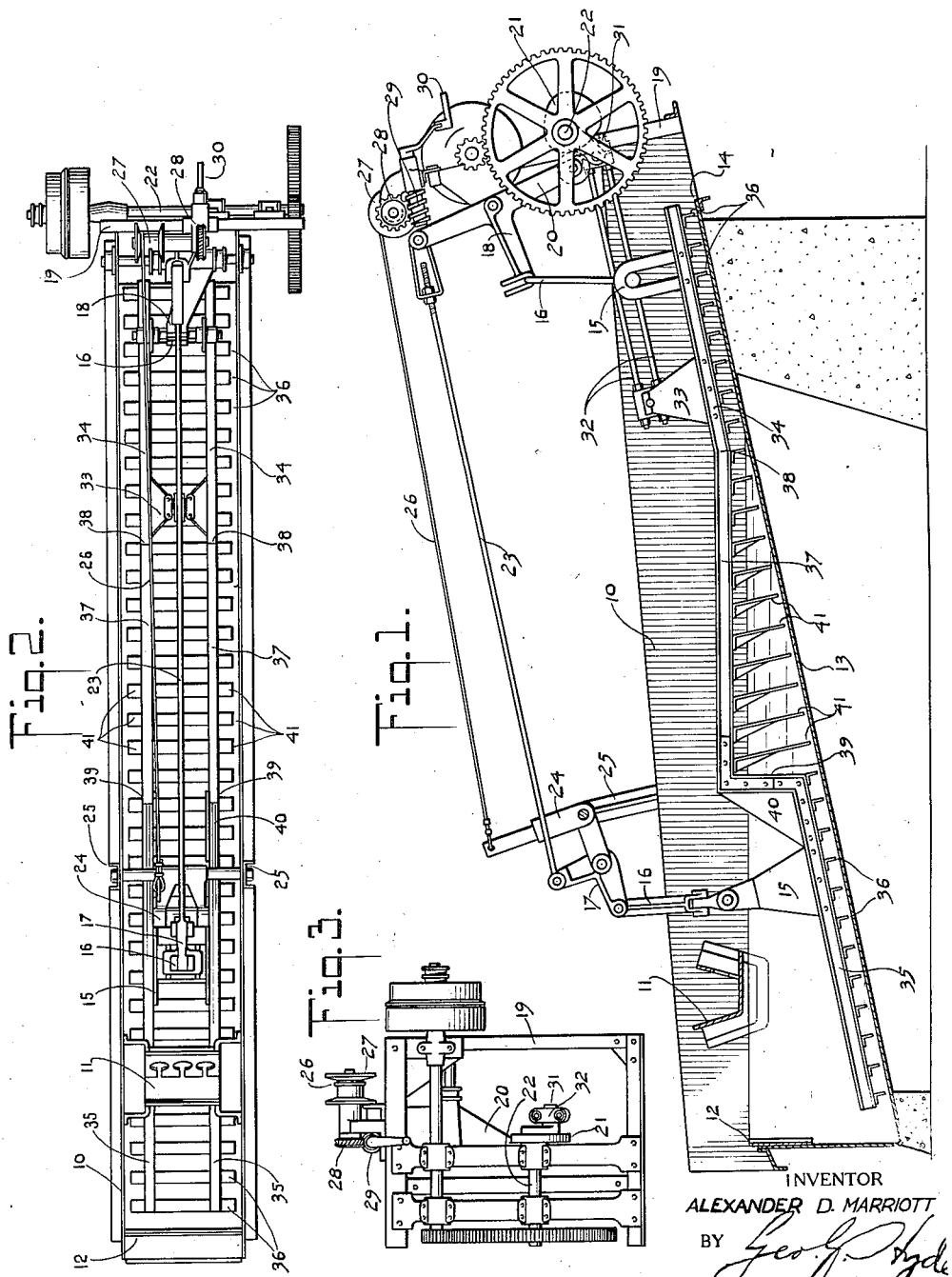

1,827,894

UNITED STATES PATENT OFFICE

ALEXANDER D. MARRIOTT, OF DENVER, COLORADO, ASSIGNOR, BY MESNE ASSIGN-
MENTS, TO THE DOOR COMPANY, INC., OF NEW YORK, N. Y., A CORPORATION OF
DELAWARE

CLASSIFICATION APPARATUS

Application filed January 29, 1929. Serial No. 335,850.

This invention relates to improvements in apparatus for removing solid particles from liquids by sedimentation followed by raking the settled solids upwardly along a sloping bottom in the settling tank to a point of discharge and overflowing the supernatant liquid. Machines of this type are generally operated in such a way that the more slowly settling solids pass off with the liquid, and are therefore referred to ordinarily as classifiers. More particularly, the invention comprises an improvement in apparatus of this type in which the solids are removed by reciprocating rakes, as in the well known Dorr classifier.

In machines of this type the raking unit comprises a series of transverse raking blades mounted below a longitudinal support and forming an elongated raking unit normally parallel to the bottom of the settling tank and extending from a point substantially above the water level to a point substantially below such level. A suitable supporting and actuating mechanism imparts to the raking unit an advance or raking movement just above the bottom and parallel thereto, in the direction of the upper or sand discharge end of the bottom. At the end of this movement the raking unit rises away from the bottom, returns parallel to the bottom but at a distance above same sufficient to clear the settled solids and then descends into position for starting the raking stroke. The rake unit may be considered as consisting of three sections, the upper end section being that portion which remains at all times above the water level and serves to carry the settled solids across the draining area on the tank bottom; the lower end section comprising the portion which remains at all times below the water level; and the connecting central section consisting of the rakes and supporting structure which with the present type of apparatus crosses the liquid level at some time during the cycle of operation.

It has been found that this arrangement is objectionable when the machine is handling liquids containing solid material which tends to accumulate on the intermediate or central section of the rake unit and is of such a nature that such accumulations are objectionable. This is particularly true of sewage, which contains rags, paper and other stringy and adhesive material which builds up extensively on any horizontal structure at the surface of the sewage, and particularly on one that reciprocates above and below such surface. Sanitary engineers are insistent that all apparatus employed in sewage treatment plants shall be free from obnoxious appearance or odor; and therefore any machine that will normally carry an accumulation of solids at a visible point is not commercially acceptable or salable.

The object of this invention is to adapt the reciprocating rake type of classifier to the treatment of sewage or other liquids containing solid material by an arrangement which will prevent visible accumulation of solid material on the rake unit. In general this has been accomplished by employing rakes of gradually increasing depth in the central zone above indicated, the depth of each rake being such that its upper margin will be above the water level when the rake is in lowermost position. Further, the channels or other structure to which the rakes are attached are located entirely above the water level down to the point where the water is sufficiently deep so that when the rakes are in uppermost position the supporting structure may be entirely below water level; and at this point the supporting structure has a substantially vertical section which will not collect solids when reciprocated vertically during operation. In general, however, the invention comprises deepening the rakes beyond their necessary height for efficient raking in order to prevent immersion of their upper edges.

Other objects and advantages of the invention will be apparent from the following description taken in connection with the accompanying drawings in which Fig. 1 is a side elevation of a classifier apparatus with tank, the adjacent side of the tank being broken way;

Fig. 2 is a plan view of same; and

Fig. 3 is an end elevation from the right of Figure 1.

The tank and rake actuating mechanism may be of any desired type of arrangement, the preferred form illustrated being of the well known Dorr type. This includes a tank 10 with feed trough 11, overflow lip 12 and sloping bottom 13 extending above the water level to the sands discharge end 14. The raking unit is supported through hanger plates 15 pivotally connected to links 16 depending from arms of bell cranks 17, 18. Bell crank 18, pivoted on the frame 19, has a depending arm 20 bearing against a cam 21 on drive shaft 22.

The upper arm of bell crank 18 is connected by reach rod 23 to the upper arm of bell crank 17 which is pivotally mounted on the lifting bell crank 24 carried by the frame 25, and connected at its upper end through cable 26 to drum 27 about which the cable passes, the drum being rotated to wind up the cable when desired through worm gear 28 on the drum shaft, worm 29 and handle 30 on the worm shaft. The rake unit is reciprocated by crank 31 on the drive shaft 22, connected by pitman 32 to drive plates 33 on the rake unit.

The rake unit comprises in general a central section in which the depth of the rakes is increased to prevent submersion of the upper parts thereof or the supporting framework connecting the rakes. Ordinarily it is necessary also to have an upper rake section which may be of any desired usual construction as the upper edges of the rakes are always above water level, this section serving to carry the sand over a draining zone before discharging it. It also is ordinarily desirable to employ a lower section of rakes connected to the lower end of the central section at a depth sufficient to assure complete submersion of the rakes and supporting structure.

In the preferred arrangement illustrated the upper and lower sections are employed, and carry the supporting and driving connections, including the hanger plates 15 and drive plates 33; and the rake unit is of the usual type, comprising parallel longitudinal beams 34, 35, 37 extending generally parallel to the tank bottom 13 and carrying the rakes 36, 41 which comprise vertical transverse blades extending across the tank 10 below beams 34, 35.

The central section of the rake unit comprises beams 37 which may be connected to or integral continuations of the beams 34 of the upper rake section, which they join at the upper junction 38. Beams 37 preferably are parallel to the water level, and are joined to the beams 35 by the vertical connecting beams 39 at the lower junction, which may be strengthened if desired by the bracing webs 40. The rakes 41 of the central section are mounted on beams 37 and have their lower edges in alignment with the lower edges of rakes 36, so that the lower edges of all rakes are in a flat plane normally parallel to the tank bottom 13. The central section rakes 41 extend substantially across the tank, and may be composed of a continuous sheet of suitable material, though this is not essential, it being only necessary that all transverse edges on such plates shall either be above the water level when the rakes are in their lowermost position or shall be below the water level when the rakes are in their uppermost position.

It will be understood that in computing the necessary length of the central rake unit from upper junction 38 to lower junction 39, the vertical extent of the supporting structure for the lower section of the rakes, such as beams 35, must be taken into consideration. The upper junction 38 is therefore positioned adjacent the uppermost point where the beams 34 would dip below the water if continued parallel to the bottom 13; while the lower junction 39 is not higher than the point where the supporting structure for the rakes 36 of the lower section, such as beams 35, would rise to the surface of the liquid when in uppermost position.

The operation of the machine is substantially the same as that of the standard reciprocating rake classifier, and is capable of the same variations in design and speed of operation to accommodate the machine to different operating conditions. The liquid containing the suspended solids is introduced through the feed trough 11, some or all of the solids settling to the bottom 13 while the supernatant liquid overflows lip 12. The settled solids are impelled step by step along the bottom 13 by the rakes 36, whose speed may be regulated to give any desired amount of agitation, thereby throwing into suspension lighter solids which have settled with the sand; and after draining on the portion of the bottom 13 above the water level, are discharged at 14. The rotation of the drive shaft 22 operates through cam 21 to impart vertical reciprocating movement to the upper portion of the rake unit (which comprises beams 34, 35, 37 and 39 and rakes 36, 41) through arm 20, bell crank 18, link 16 and hanger plate 15; and to the lower portion of the rake unit through reach rod 23, bell crank 17, link 16 and plates 15. A longitudinal reciprocating movement is given to the rake unit by crank 31, pitman 32 and drive plates 33. Cam 21 is so shaped and positioned that the rake unit will have a substantially rectilinear advance movement parallel to the bottom 13, at the end of which the unit will be lifted, returned parallel to but substantially above bottom 13 and descend in position for another advance raking movement. In case of accumulation of solids in the lower end of the tank 10 as by a shut down, the lower end of the rake unit can be raised by rotating drum 27 by means of handle 30, rocking the lifting bell crank 24 through pulling in cable 26, and thereby elevating bell crank 17 and the lower portion of the rake unit suspended therefrom.

During normal operation the deepened rakes 41 and the vertical beams 39 with bracing webs 40, together with the upper part of plates 15, will be the only portions of the mechanism moving through the surface of the liquid; and as all of these members are substantially vertical, no solid material suspended in the liquid will have an opportunity of collecting thereon.

It will be apparent that various types of raking mechanisms and drives therefor may be employed, and that the structure for connecting and supporting the rakes may be considerably varied both in construction and arrangement without departing from this invention.

Claims:

1. A classifier comprising a settling tank having a sloping bottom and an outlet for supernatant liquid, and means for conveying settled solids upwardly along said bottom to a point of discharge above the liquid level including a series of transverse rake members comprising a raking unit, the members of a section of said series increasing gradually in depth from one end of said section to the other; and means for connecting said rake members to form the raking unit.

2. A classifier comprising a settling tank having a sloping bottom and an outlet for supernatant liquid, and means for conveying settled solids upwardly along said bottom to a point of discharge above the liquid level including a series of rake members, said series including upper and lower end sections in which the rakes are of substantially uniform depth and a central section having rake members of greater depth, and means connecting said rake members to form a raking unit.

3. A classifier comprising a settling tank having a sloping bottom and an outlet for supernatant liquid, and means for conveying settled solids upwardly along said bottom to a point of discharge above the liquid level, including a series of rake members extending from a zone above the liquid level to a zone below said level, said members having their lower margins in a single lower plane, the rake members of a section of said series extending upwardly to a plane parallel to the liquid level and at an angle to said lower plane; and means for connecting said rake members to form a raking unit.

4. A classifier comprising a settling tank having a sloping bottom and an outlet for supernatant liquid, and means for conveying settled solids upwardly along said bottom to a point of discharge above the liquid level including a series of rake members extending from a zone above the liquid level to a zone below the liquid level, rake members extending across the liquid level being of increased depth sufficient to maintain their upper margins above the liquid level at all times during operation; and means for supporting and actuating said series of rake members.

5. A classifier comprising a settling tank having a sloping bottom and an outlet for supernatant liquid, and means for conveying settled solids upwardly along said bottom to a point of discharge above the liquid level comprising a series of rake members extending from a zone below the liquid level to a zone above the liquid level and means for imparting a reciprocating raking movement to said members including movement across the liquid level, the transverse upper margins of all rake members passing through the liquid level being located at all times above said level.

6. A classifier comprising a settling tank having a sloping bottom and an outlet for supernatant liquid, and means for conveying settled solids upwardly along said bottom to a point of discharge above the liquid level comprising a series of rake members including upper and lower end sections in which the upper margins of the rake members are located in planes substantially parallel to the sloping bottom, and a central section in which the upper margins of the rake members are located in a plane parallel to the liquid level; and means for supporting and actuating said rake members.

In testimony whereof I affix my signature.

ALEXANDER D. MARRIOTT.

CERTIFICATE OF CORRECTION.

Patent No. 1,827,894.                            Granted October 20, 1931, to

ALEXANDER D. MARRIOTT.

It is hereby certified that error appears in the above numbered patent requiring correction as follows: In the heading to the printed specification the name of assignee was erroneously written and printed as "The Door Company, Inc.", whereas said name should have been written and printed as The Dorr Company, Inc., as shown by the records of assignments in this office; and that the said Letters Patent should be read with this correction therein that the same may conform to the record of the case in the Patent Office.

Signed and sealed this 8th day of December, A. D. 1931.

(Seal)

M. J. Moore,
Acting Commissioner of Patents.